United States Patent
Spurlock et al.

(10) Patent No.: US 9,201,511 B1
(45) Date of Patent: Dec. 1, 2015

(54) OPTICAL NAVIGATION SENSOR AND METHOD

(75) Inventors: Brett Alan Spurlock, Felton, CA (US); Yansun Xu, Moutain View, CA (US); Huy Tae, San Jose, CA (US); John Frame, Arcadia, CA (US); Chunguang Xia, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 349 days.

(21) Appl. No.: 13/079,788

(22) Filed: Apr. 4, 2011

Related U.S. Application Data

(60) Provisional application No. 61/327,629, filed on Apr. 23, 2010.

(51) Int. Cl.
 *G06F 3/033* (2013.01)
 *G09G 5/00* (2006.01)
 *G06F 3/03* (2006.01)

(52) U.S. Cl.
 CPC .................................. *G06F 3/0304* (2013.01)

(58) Field of Classification Search
 CPC ...................................................... G09B 13/00
 USPC ................................................. 345/156–172
 See application file for complete search history.

(56) References Cited

U.S. PATENT DOCUMENTS

| | | | |
|---|---|---|---|
| 4,812,831 A * | 3/1989 | Laier | 345/175 |
| 5,231,380 A | 7/1993 | Logan | |
| 6,496,181 B1 | 12/2002 | Bomer et al. | |
| 6,677,927 B1 | 1/2004 | Bruck et al. | |
| 6,720,892 B1 * | 4/2004 | Lachor | 341/22 |
| 7,138,620 B2 * | 11/2006 | Trisnadi et al. | 250/221 |
| 7,469,386 B2 | 12/2008 | Bear et al. | |
| 2005/0200598 A1 * | 9/2005 | Hayes et al. | 345/156 |
| 2007/0109272 A1 | 5/2007 | Orsley et al. | |
| 2007/0138377 A1 * | 6/2007 | Zarem | 250/221 |
| 2008/0013805 A1 | 1/2008 | Sengupta et al. | |
| 2009/0179869 A1 | 7/2009 | Slotznick | |
| 2009/0195503 A1 * | 8/2009 | Lee et al. | 345/166 |
| 2010/0127977 A1 * | 5/2010 | Sung et al. | 345/157 |

FOREIGN PATENT DOCUMENTS

| | | | |
|---|---|---|---|
| EP | 2073103 A1 | 6/2009 | |
| GB | 2423576 A1 | 8/2006 | |

OTHER PUBLICATIONS

Praveen Kumar and Rama Sai Krishna, "Finger navigation in HID," downloaded from http://www.eetimes.com/design/industrial-control/4211177/Finger-navigation-in-HID on Jul. 5, 2011; dated Dec. 1, 2010; 5 pages.

\* cited by examiner

*Primary Examiner* — Kenneth B Lee, Jr.

(57) ABSTRACT

Optical navigation sensors and methods are provided for use in an input device. In one embodiment, the input device comprises: (i) a button configured to in a first mode of operation of the input device receive user input when a surface of the button is pressed; (ii) an optical navigation sensor (ONS) configured to in a second mode of operation of the input device illuminate an object in proximity to the surface of the button and to sense and provide input related to motion of the object; and (iii) means for disabling input from the ONS in the first mode of operation. Other embodiments are also disclosed.

18 Claims, 6 Drawing Sheets

OPTICAL NAVIGATION SENSOR AND METHOD

RELATED APPLICATIONS

The present application claims the benefit of priority under 35 U.S.C. 119(e) to U.S. Provisional Patent Application Ser. No. 61/327,629 entitled "Method And Apparatus For Optical Finger Navigation," filed Apr. 23, 2010, which application is hereby incorporated by reference in its entirety.

TECHNICAL FIELD

The present disclosure relates generally to input devices, and more particularly to an optical navigation sensor and its method of operation.

BACKGROUND

Data processing systems, such as personal computers, tablet computers, entertainment systems, game consoles, and cellular telephones, commonly include keyboards that use keys or mechanical trackballs for cursor navigation. Existing mechanical trackballs are prone to failure due to mechanical wear and malfunction due to environmental contaminants, such as dust and lint. Moreover, functional tracking performance of mechanical trackballs is not as good as that for purely optical devices. Jog keys typically only permit incremental up/down and left/right cursor movements. In addition, mechanical trackballs have large form factors, requiring significant portion of the keyboard surface, and keys require a much larger area underneath the keyboard making them unsuitable for many applications.

BRIEF DESCRIPTION OF THE DRAWINGS

These and various other features of an optical navigation sensor and its method of operation will be apparent upon reading of the following detailed description in conjunction with the accompanying drawings and the appended claims provided below, where:

DETAILED DESCRIPTION

Figure 1A:
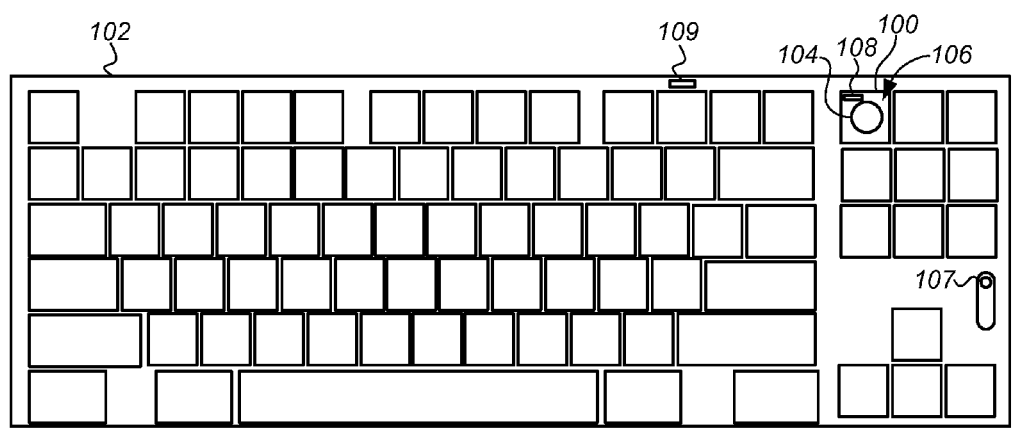
FIG. 1A illustrates an optical navigation sensor (ONS) integrated into a key on an electronic keyboard according to an embodiment.

Optical navigation sensors and methods are provided for use in an input device. In one embodiment, the input device comprises a hybrid or multifunctional button to receive user input in a first mode when the button is pressed, and in a second mode an optical navigation sensor to illuminate an object in proximity to the button to sense motion of the object. Other embodiments are also disclosed.

The drawings described are only schematic and are non-limiting. In the drawings, the size of some of the elements may be exaggerated and not drawn to scale for illustrative purposes. The dimensions and the relative dimensions may not correspond to actual reductions to practice of the invention. For purposes of clarity, many details of input devices and methods of operation in general, and buttons, keys and optical navigation sensors in particular, which are widely known and not relevant to the present apparatus and method have been omitted from the following description.

In various embodiments, a small form factor optical navigation sensor (ONS) can be implemented or integrated in a variety of input devices, such as a keyboard, a mouse button or housing, a remote control, a portable communication device, or any control interface coupled to an electrical device. For example, in one embodiment, shown in FIG. 1A, the ONS (not shown in the this figure) may be integrated into one or more buttons or keys 100 on a keyboard 102, the key including an opening or optically transparent window 104 in or through a surface 106 of the button through which the ONS, senses relative movement and or gestures of a tracking surface, such as a finger, a stylus, a palm, or other suitable object. Because of the small form factor, of the ONS may be integrated into an existing control element, thereby providing additional functionality without consuming valuable area on a user device. For example, in the embodiment illustrated in FIG. 1A, the ONS can be integrated into the "home" key 100 of the keyboard 102. Thus in a first or non-optical mode of operation, the key 100 may be used as the standard home key activated by depressing the key. In a second or optical mode of operation, the integrated ONS may be configured to perform various functions, such as cursor navigation, inputting or detecting functional gestures, or in some embodiments, customizable functions corresponding to specific machine or application inputs.

The key 100 may retain original key function and be toggled to an optical mode of operation (finger navigation) by a user or programmatically selected by a software control module resident in the input device or a data processing system. In one embodiment, the mode of operation may be toggled to enable or disable input from the ONS by a software control module (not shown in this figure) using the input device that is automatically initiated or executed by another program. For example, the opening of a browser program, graphics program or other program dependent on cursor navigation or detecting functional gestures can initiate the software control module to select the optical mode of operation. In other embodiments, the mode of operation may be selected or toggled to enable or disable input from the ONS by the user using a switch 107 on the device or keyboard 102 specifically provided for that purpose, by key sequencing, by a capacitive sensor sensing the presence of a conductive object in proximity to the key 100, or by the ONS in response to a gesture from the object sensed by the ONS. By key sequencing it is meant the simultaneous or sequential pressing or operation of one or more separate buttons or keys on the device or keyboard. The keys pressed in key sequencing may or may not include the key 100 housing the ONS.

Once toggled, an indicator 108 may be activated to let a user know the functionality or mode has changed from the key function to finger navigation using the optical sensor. For example, the indicator 108 may be a light emitting diode (LED) built into the key 100, an indicator 109 located elsewhere on the keyboard, an on screen indicator such as a graphic, or other such indicator locatable on any of the various user interfaces that may be coupled to or associated with the input device. The ONS may detect motion as well as gestures, such as double tapping the window 104, sweeping the object across the window in a particular direction, and the like.

In one embodiment, the ONS and its associated signal processing circuitry can include algorithms to adjust motion tracking resolution dynamically (on-the-fly) based on the detected motion speed and motion pattern. For example, the signal processing circuitry can include algorithms to provide higher resolution at low detected speeds and lower resolution at higher speeds, or vice versa; and/or to increase the resolution when it is detected the user is performing repetitive fast finger-swipes in a single direction for faster up/down or side-to-side scrolling.

Additionally, the ONS may not require physical contact with the surface 106 of the button or key 100 and may be activated or used based on proximity to the ONS.

Figure 1B:
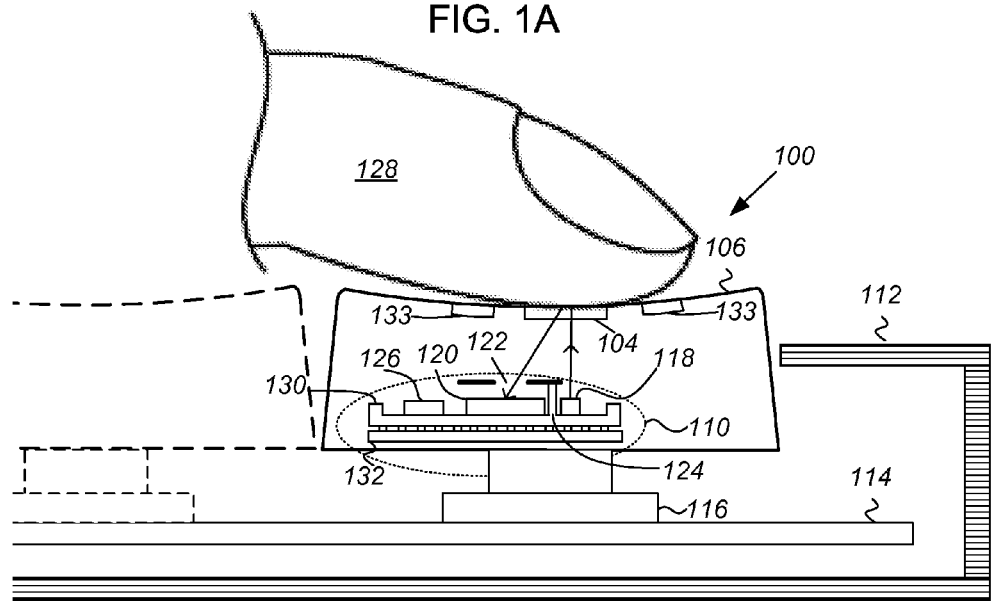
FIG. 1B illustrates a sectional view of a key of FIG. 1A having an ONS integrated therein according to an embodiment.

Referring to the embodiment of FIG. 1B, the input device (keyboard 102) may include multiple buttons or keys, including the key 100 housing or enclosing an ONS 110. Generally, the keyboard 102 further includes a housing 112 enclosing a circuit board or PCB 114 to which an electrical switch or switching circuit 116 of the key 100 can be mounted. The key 100 may, as in the embodiment shown, be mechanically coupled to the switching circuit 116 to receive user input in a first mode (e.g., to perform the standard functions of a "home" key) when the key is depressed.

Components of the ONS 110 may include an illuminator or light (photon) source 118—such as a light emitting diode (LED), a laser or Vertical Cavity Surface Emitting Laser (VCSEL)—a photo-detector array 120, such as an array of photodiodes, and, optionally an aperture 122 to set a passive lift cutoff and to enhance performance of the ONS for use in particular applications, i.e., finger navigation, a separate photo detector or detectors may also used for automatic gain control of the tracking sensor or to set programmable lift cut off, and a light baffle 124 separating the light source from the photo-detector array. In particular, the aperture 122 may be sized, shaped, and located relative to the a photo-detector array 120 to produce a specific illumination shape, intensity, uniformity, location, size, or to fill a portion of photo-detector array to optimize tracking accuracy and maximum tracking speed of the ONS 110 on a wide range of different surfaces.

Generally, the ONS 110 may further include front-end electronics, signal processing circuitry, and interface circuitry (collectively labeled as 126) for translating changes in a pattern of light returned onto the photo-detector array 120 from an object 128, such as a stylus or finger, into motion data. By returned it is meant light either reflected or scattered from the object 128 onto the photo-detector array 120.

Components of the ONS 110 can embody one or more integrated circuits (ICs) or discrete components packaged within a common multi-chip module (MCM) or package 130, as shown FIG. 1B, or can include a number of discrete, individually packaged circuits and components separately mounted to an ONS PCB 132. For example, the photo-detector array 120, front-end electronics, signal processing circuitry and interface circuitry 126 can be integrally formed as a single IC with a drive circuit for the light source 118 and packaged in a single IC package 130.

Optionally, as noted above, the input device (keyboard 102) may further include within the key 100 housing or enclosing an ONS 110 one or more capacitive sensors 133 to select or toggle the mode of operation when a conductive body, such as a thumb or finger, is sensed in proximity to the capacitive sensors. The capacitive sensors 133 can include any capacitive sensor capable of fitting within the enclosure 104 of a portable or battery operated device. For example, one suitable capacitive sensor 133 can be developed using a CY3240 USBI2C development kit and software, commercially available from Cypress Semiconductor Corp., of San Jose, Calif. Generally, each capacitive sensor 133 includes a number of dielectric sensor traces coupled to the signal processing circuitry and interface circuitry 126, which is configured to detect changes in the sensor capacitance. One possible embodiment or layout for the capacitive sensor 133 can include two or more discrete capacitive sensors located in the key 100 on different sides of the window 104 as illustrated in FIG. 1B. In another layout (not shown) the capacitive sensor 133 can include a ring located in the key 100 and circumscribing the window 104. Additionally, the capacitive sensors 133 can be further configured to sense an object, such as a thumb or finger, for additional input or select operations.

Figure 1C:
FIG. 1C illustrates a sectional view of a portion of a window in the key of FIG. 1B.

A cross-sectional side view of a portion of the window 104 in the button 100 is shown in FIG. 1C. Referring to the embodiment of FIG. 1C, the window 104 can include one or more layers 134, 136, 138, 140, of plastic, glassine or crystalline materials that are substantially transparent to at least one wavelength of light, which can be emitted by the light source and sensed by the detector. In addition, the window 104 should be of a good optical quality so that it does not disperse light passing through. Outer and/or inner layers 134, 140, of the window 104 can be selected for physical or optical properties, such as abrasion resistance, strength and/or low reflection. Low reflection may be achieved through the use of an additional anti-reflective coatings (ARC), layers or surfaces 142.

In one embodiment the window 104 has at least two filtering layers 136, 138, including a first filter layer to block light having wavelengths shorter than the wavelength of the light source, and a second filter to block light having wavelengths longer than the wavelength of the light source.

Figure 2:
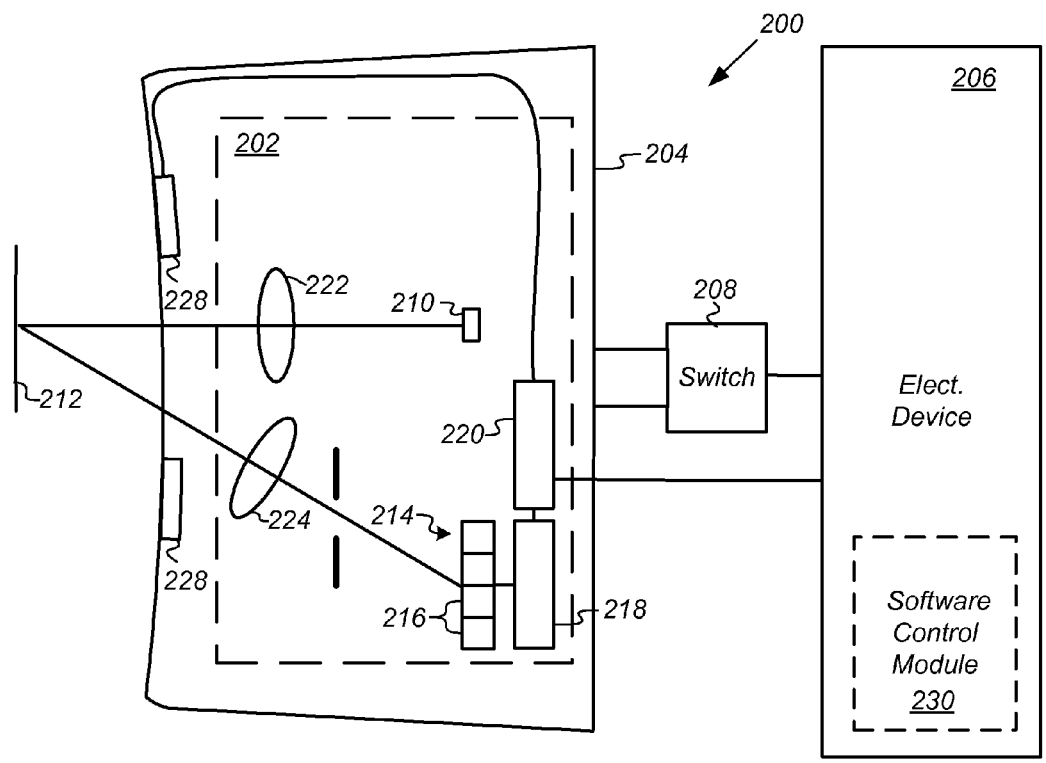
FIG. 2 illustrates a block diagram of an input device including an ONS and a multifunctional mechanical button for use with an electronic device.

A block diagram of an input device 200 including an ONS 202 and a hybrid or multifunctional button 204 for use with an electronic device 206 is illustrated in FIG. 2. The ONS 202 and a switch or switching circuit 208 mechanically coupled to the multifunctional button 204 can be electrically coupled (wired) to the electronic device 206 (as shown), wirelessly coupled to the electronic device, or included within electronic device.

Referring to FIG. 2, the ONS 202 generally includes a light source 210 to illuminate a portion of an object 212, a one or more one-dimensional (1D) or two-dimensional (2D) photo-detector arrays 214 each having a number of photosensitive elements, such as photodiodes 216 on which light reflected from the surface 212 can be received. The photo-detector array(s) 214 may be configured to detect motion along one or more axes as well as detect gestures performed with the object 212. The ONS 202 can further include front-end electronics 218 to combine or wire sum signals from individual photodiodes 216 or groups of photodiodes in the photo-detector arrays 214, and signal processing circuitry 220 to translate changes in a pattern of light returned onto the photo-detector arrays 214 into motion and/or gesture data.

Optionally, the ONS 202 may further include collimating or illumination optics (represented schematically by element 222) to focus or direct light onto the object 212, imaging optics (represented schematically by element 224) to map or image a pattern of light returned by the object onto the photo-detector array(s) 214, and/or an aperture 226 to substantially block interference from environmental light and set a passive lift cutoff for the ONS.

As noted above, the input device 200 may further include one or more capacitive sensors 228 coupled to the signal processing circuitry 220, which is configured to detect changes in the sensor capacitance to sense an object, such as a thumb or finger, to enable the ONS 202 or for additional input or select operations. As also noted above, the electronic device 206 may include a software control module 228 to enable or disable input from the ONS 202. The software control module 228 may be automatically initiated or executed by another program or by the user.

In certain embodiments, the ONS can be a speckle-based ONS including a coherent or narrow band light source, such as a VCSEL, and a speckle sensitive photo-detector array. A speckle-based ONS determines the relative displacement between the ONS and the tracking surface by detecting the corresponding displacement of the speckle pattern at the photo-detector array. This applies to all ONS technologies that use speckle pattern motion, including image correlation and ONS utilizing comb-arrays as the photo-detector array.

Operating principles of a speckle-based ONS will now be described with reference to FIG. 3. For purposes of clarity, many of the details of speckle-based ONS, which are widely known and not relevant to the present invention, have been omitted from the following description. Speckle-based ONS are described, for example, in commonly assigned U.S. Pat. No. 7,138,620, entitled, "Two-Dimensional Motion Sensor," by Jahja Trisnadi et al., issued on Nov. 21, 2006, and incorporated herein by reference in its entirety.

Figure 3:
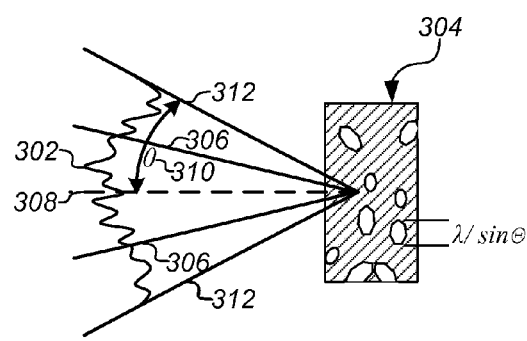
FIG. 3 illustrates a speckle pattern in light returned from an optically rough surface according to an embodiment.

Referring to FIG. 3, any general surface with morphological irregularities of dimensions greater than the wavelength of the incident light (i.e. roughly>1 μm) will tend to scatter light 302 into a complete hemisphere in approximately a Lambertian fashion. If a coherent light source, such as a laser is used, the spatially coherent light returned from the surface will create a complex interference pattern upon detection by a square-law detector with finite aperture. This complex interference pattern of light and dark areas is referred to as speckle or a speckle pattern 304. As shown in FIG. 3, the contribution for the measured speckle pattern 304 comes from rays 306 between the surface normal 308 and the extreme rays 312. Speckle is the random interference pattern generated by scattering of coherent light off a rough surface and detected by an intensity photosensitive element, such as a photodiode, with a finite angular field-of-view or numerical aperture (NA). The detailed nature of the speckle pattern depends on the surface topography, and the wavelength of light scattered therefrom. A translational speckle pattern resulted from a moving rough surface can be employed to identify any relative motion between the ONS and the surface as it is displaced transversely to the ONS.

A speckle sensitive photo-detector array can include one or more linear or one-dimensional (1D) or a two-dimensional (2D) comb-array having multiple detectors or photosensitive elements arranged in a two-dimensional configuration.

Figure 4:
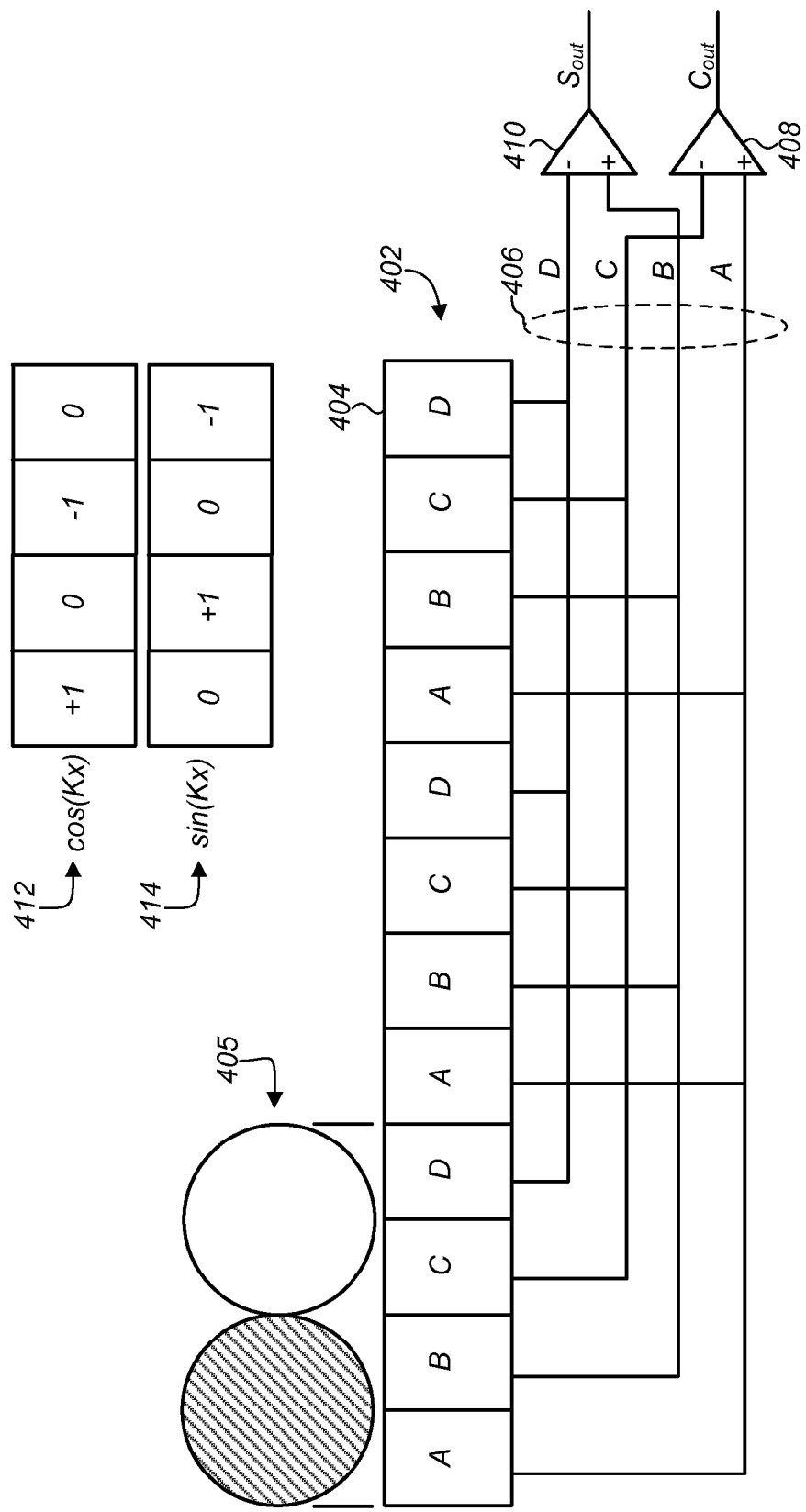
FIG. 4 illustrates a schematic block diagram of a speckle based linear or one-dimensional (1D) comb-array for use in an ONS according to an embodiment.

A linear or 1D comb-array is an array having multiple photosensitive elements that are connected in a periodic manner, so the array acts as a fixed template that integrates one spatial frequency component of the signal. An embodiment of one such 1D comb-array is shown in FIG. 4. The connection of multiple photosensitive elements in a periodic manner enables the comb-array to serve effectively as a correlator at one spatial frequency K (defined by a pitch of the photosensitive elements in the array and the collection optics). FIG. 4 shows a general configuration (along one axis) of a 1D comb-array 402 of photosensitive elements, such as photodiodes 404, wherein the combination of interlaced groups of photosensitive elements serves as a periodic filter on spatial frequencies of light-dark signals 405 produced by the speckle (or non-speckle) images. In the embodiment shown, the 1D comb-array 402 consists of a number of photodiode sets or periods, each having four of photodiodes 404, labeled here as A, B, C, and D. Currents or signals from corresponding or similarly labeled photodiodes 404 in each period are electrically connected (wired sum) to form four line signals 406 coming out from the array 402. Background suppression and signal accentuation is accomplished by using first differential analog circuitry 408 to generate an in-phase differential current signal, labeled here as $C_{out}$, and second differential analog circuitry 410 to generate a quadrature differential current signal, labeled here as $S_{out}$. Comparing the phase of the in-phase and quadrature signals permits determination of the magnitude and direction of motion of the 1D comb-array 402 relative to a scattering surface.

Referring to FIG. 4, the in-phase $C_{out}$ and the quadrature $S_{out}$ signals are obtained by taking the underlying speckle pattern and processing them according to the cosine and sine templates, 412 and 414 respectively. The ONS may be designed so that an optical "light-dark" signal pattern, i.e., speckle, has a size substantially equal to the period of the comb-array-four (4) photodiodes 404 or pixels in the embodiment of FIG. 4. The in-phase signal current is obtained from $C_{out}$=A−C, and the quadrature signal current from $S_{out}$=B−D as shown in FIG. 4.

Figures 5A, 5B:
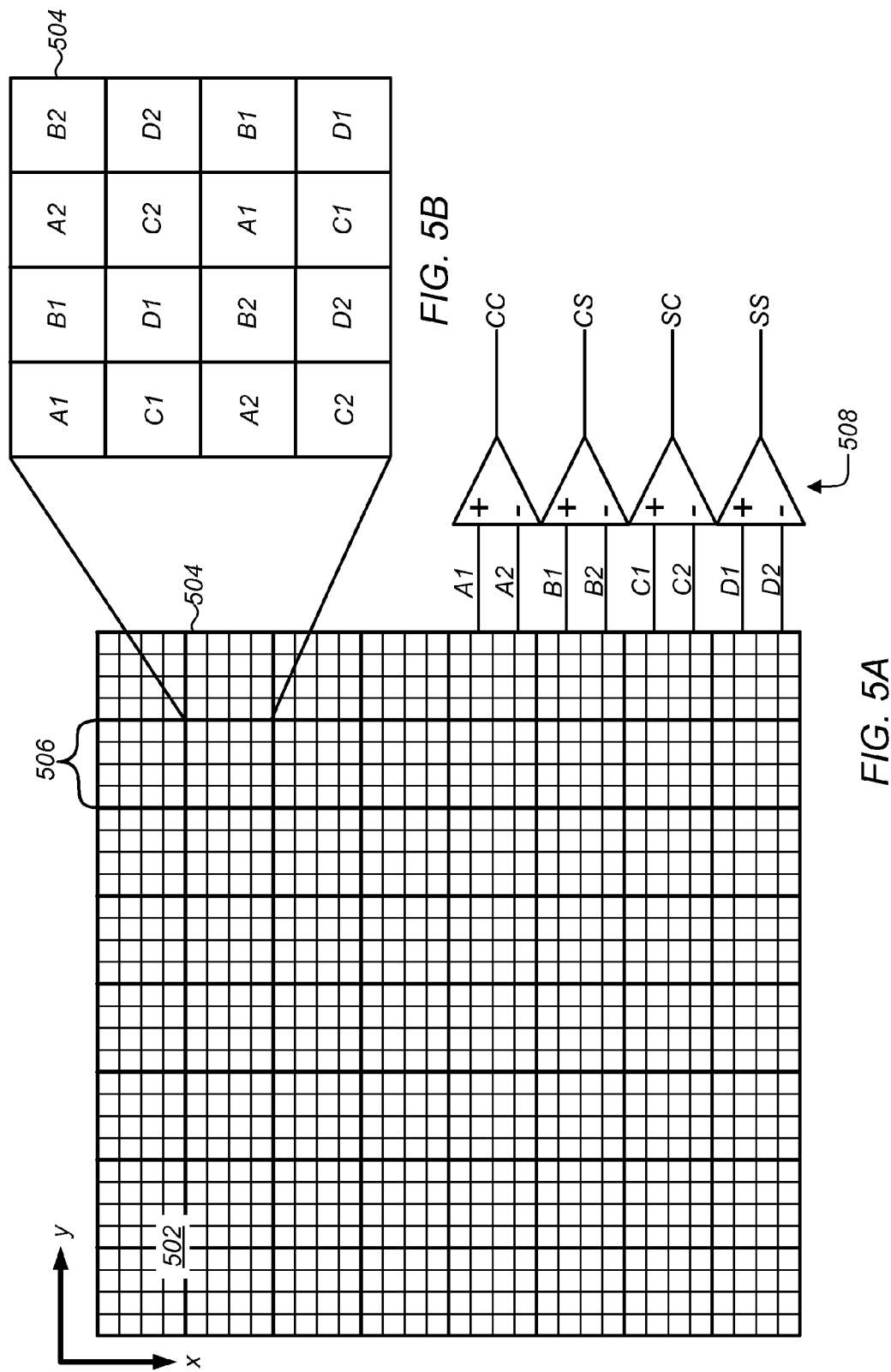
FIGS. 5A and 5B illustrates schematic block diagrams of a two-dimensional (2D) comb-array for use in an ONS according to an embodiment.

In one embodiment the photo-detector array includes photodiodes or photosensitive elements are arranged in two dimensions (2D), as shown in FIGS. 5A and 5B. The performance of the 2D comb-array is expected to be superior to the 1D×1D case since each point in the image, in the average, traverses a much longer path inside the 2D detector active area in all directions and therefore contributes more to the displacement estimation. FIGS. 5A and 5B are schematic block diagrams of a 2D comb-array having photosensitive elements grouped in a 4×4 elements-per-cell configuration. Referring to FIGS. 5A and 5B, the 2D comb-array 502 may have multiple photosensitive elements 504 arranged or grouped into cells 506, each cell having photosensitive elements grouped in a 4×4 elements-per-cell (or 4×4 elements/period) configuration. Photosensitive elements 504 within a cell 506 with the same letter and same number, as shown in the detail of FIG. 5B, as well as corresponding elements of all cells in the 2D comb-array 502 with the same number, are electrically connected or wired-sum to yield eight signals A1 through D2. The eight wired-sum signals are further combined with differential amplifiers 508 to provide four signals containing the in-phase and quadrature information in the x and y directions.

Figure 6:
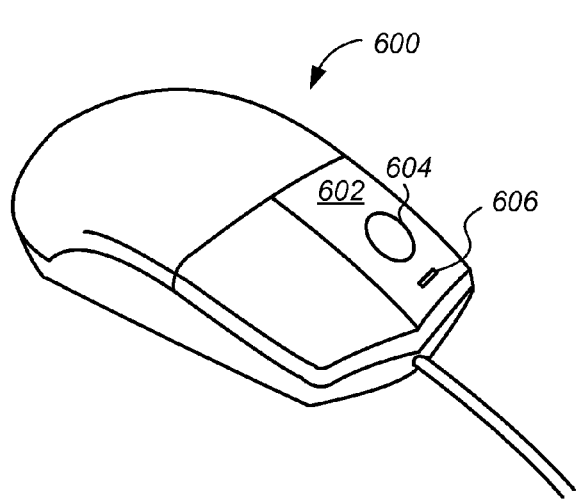
FIG. 6 illustrates an ONS integrated into a button on a computer mouse according to an embodiment.

In another embodiment, shown in FIG. 6, the input device comprises an optical computer mouse 600 including a button 602 with an optical navigation sensor 604 located or housed therein to sense relative movement between the optical navigation sensor and an object, i.e., a finger, on or proximal to the mouse button. Optionally, as described above with respect to keyboard 102 the mouse 600 may further include an indicator

606, such as an LED, built into the button 602 to let a user know whether the optical navigation sensor 604 is enabled or disabled.

Figure 7:
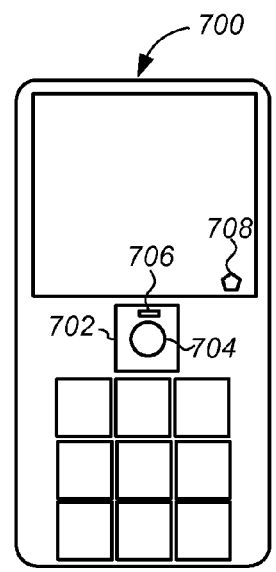
FIG. 7 illustrates an ONS integrated into a button on a handheld device according to an embodiment.

In yet another embodiment, shown in FIG. 7, the input device is housed within and used with a mobile or handheld electronic device 700, such as cellular telephone, a game controller, remote pointing device or personal digital assistant (PDA). Referring to FIG. 7 in this embodiment the input device can comprise a button 702 with an optical navigation sensor 704 located or housed therein to sense relative movement between the optical navigation sensor and an object, i.e., a finger, on or proximal to the button. Optionally, as described above the handheld electronic device 700 may further include an indicator 706, such as an LED, built into the button 702 or elsewhere on the handheld device, or an on screen indicator 708 to let a user know whether the optical navigation sensor 704 is enabled or disabled.

Figure 8:
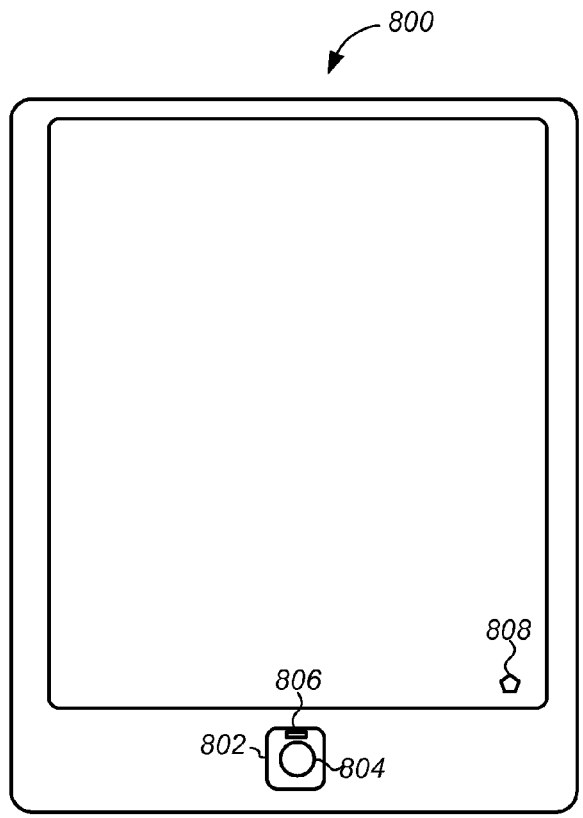
FIG. 8 illustrates an ONS integrated into a button on an electronic device according to another embodiment.

In still another embodiment, shown in FIG. 8, the input device is housed within and used with an electronic device 800, such as digital reader or tablet computer. Referring to FIG. 8 in this embodiment the input device can comprise a button 802 with an optical navigation sensor 804 located or housed therein to sense relative movement between the optical navigation sensor and an object, i.e., a finger, on or proximal to the button. Optionally, the electronic device 800 may further include an indicator 806, such as an LED, built into the button 802 or elsewhere on the device, or an on screen indicator 808 to let a user know whether the optical navigation sensor 804 is enabled or disabled.

Figure 9:
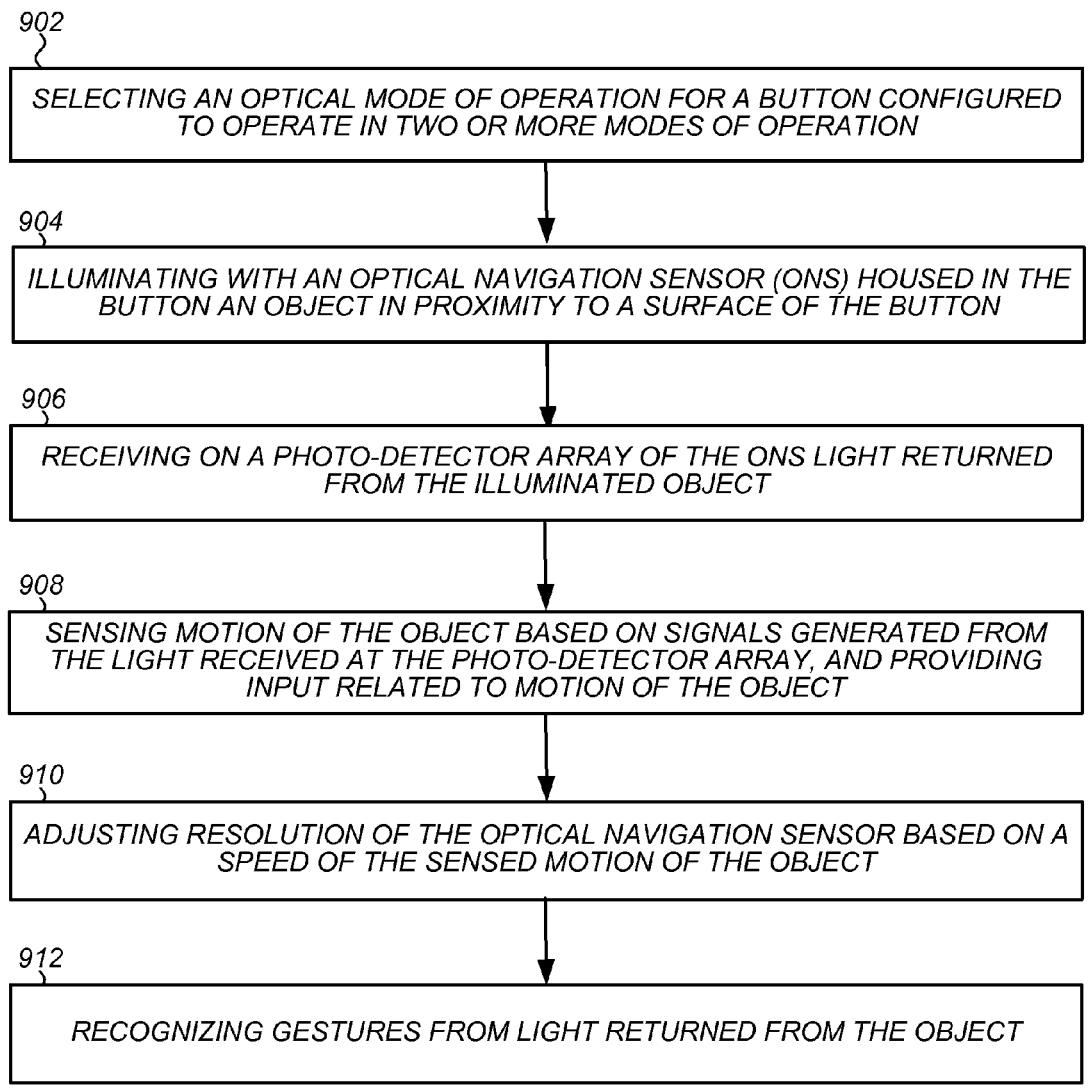
FIG. 9 is a flow chart of a method for operating an input device including ONS integrated into a button or key according to an embodiment.

Embodiments of methods of operating a input device including an optical navigation sensor and capable of operating in two or more modes of operation will now be described with reference to the flowchart of FIG. 9.

In a first block, a user selects an optical mode of operation for a button configured to operate in two or more modes of operation (902). Next, an object in proximity to a surface of a button is illuminated using an ONS (904). In one embodiment, the object is illuminated through an opening or window in the surface of the button. Light returned from the object is received on a photo-detector array in the ONS (906), and motion of the object relative to the ONS is sensed based on signals generated from the light received at the photo-detector array, and input related to motion of the object provided (908). Optionally, the method can further include adjusting resolution of the optical navigation sensor based on a speed of the sensed motion of the object (910), and/or recognizing gestures, such as a double tap, from light returned from the object (912).

Selecting between an optical mode of operation and a non-optical mode of operation can be accomplished by receiving one or more signals from a switch, one or more separate buttons on the device, a capacitive sensor, a software control module, or the ONS in response to a gesture from the object sensed by the ONS. For example, selection between modes of operation can be accomplished by operating a switch or pressing the button simultaneously or in sequence with one or more keys on the device (key sequencing). Alternatively, as described above, a capacitive sensor can be used to detect presence of an object or finger in proximity to or in contact with the button without pressing the button to activate the switching circuit 208, and select an optical mode of operation. In certain embodiments, selecting an optical mode of operation can be accomplished by a gesture such as a double tap.

Thus, embodiments of an optical navigation sensor and method and methods for operating the same have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the hot de-latch system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. An input device comprising:
   a button configured in a first mode of operation of the input device to receive user input when a surface of the button is pressed;
   an optical navigation sensor (ONS) housed within the button, the ONS configured in a second mode of operation of the input device to illuminate an object in proximity to the surface of the button through a window in the surface of the button, and to sense and provide input related to motion of the object; and
   a circuit configured to disable input from the ONS in the first mode of operation, the circuit comprising circuitry configured to enable input from the ONS and disable input from the button in the second mode of operation.

2. The input device of claim 1, wherein the ONS is further operable to sense one or more gestures from the object.

3. The input device of claim 2, wherein the circuit for disabling input from the ONS comprises a switch, a capacitive sensor, a software control module, circuitry for sensing a gesture from the object with the ONS or circuitry for receiving one or more signals from a separate button on the device.

4. The input device of claim 1, further comprising signal processing circuitry to process the sensed motion of the object, wherein the signal processing circuitry is configured to dynamically adjust a resolution of the ONS based on a speed of the sensed motion.

5. The input device of claim 1 further comprising an indicator on the input device, button or a display coupled to the device configured to indicate when the input device is operating in at least one of the first mode of operation or the second mode of operation.

6. The input device of claim 1, wherein the object is a finger.

7. The input device of claim 1, wherein the button is a key on a keyboard.

8. The input device of claim 1, wherein the button is a button on a handheld device.

9. The input device of claim 1, wherein the button is a mouse button on a computer mouse.

10. The input device of claim 1, wherein the ONS is a speckle-based ONS comprising a coherent light source to illuminate the object and a comb array to sense motion of the object based on motion of a complex interference pattern created by a light returned from a surface of the object.

11. An input device comprising a button housing an optical navigation sensor (ONS), the button configured to in a first mode receive user input when pressed, and in a second mode to with the ONS illuminate an object in proximity to a surface of the button through a window in the surface of the button and to sense and provide input related to motion of the object, wherein in the first mode the user input received when the button is pressed is independent of input provided in the second mode, and a software control module to disable input from the ONS in the first mode, and to enable input from the ONS and disable input from the button in the second mode.

12. The input device of claim 11 further comprising signal processing circuitry to process the sensed motion of the object, wherein the signal processing circuitry is configured to dynamically adjust a resolution of the ONS based on a speed of the sensed motion.

13. The input device of claim 11 further comprising an indicator on the input device, button or a display coupled to the device configured to indicate when the input device is operating in at least one of the first mode or the second mode.

14. The input device of claim 11, wherein the ONS is a speckle-based ONS comprising a coherent light source to illuminate the object and a comb array to sense motion of the object based on motion of a complex interference pattern created by a light returned from a surface of the object.

15. The input device of claim 14, wherein the object is illuminated through a window in the surface of the button that is substantially transparent to at least one wavelength of light emitted by the coherent light source, while attenuating other wavelengths of light.

16. A method comprising:
   selecting an optical mode of operation for a button configured to operate in two or more modes of operation;
   illuminating with an optical navigation sensor (ONS) housed in the button an object in proximity to a surface of the button through a window in the surface of the button; and
   receiving on a photo-detector array of the ONS light returned from the illuminated object;
   sensing motion of the object based on signals generated from the light received at the photo-detector array;
   providing input related to motion of the object;
   selecting a non-optical mode of operation for the button; and
   receiving user input when the button is pressed and disabling the ONS.

17. The method of claim 16, wherein the user input received when the button is pressed is independent of input provided in the optical mode of operation.

18. The method of claim 16, wherein selecting an optical mode of operation or selecting a non-optical mode of operation comprises receiving one or more signals from a switch, a capacitive sensor, a software control module, or the ONS in response to a gesture from the object sensed by the ONS.

* * * * *